United States Patent
Ohura et al.

(10) Patent No.: US 10,858,524 B2
(45) Date of Patent: Dec. 8, 2020

(54) PROTECTIVE FILM FORMING RESIN AGENT AND LASER PROCESSING METHOD

(71) Applicant: DISCO CORPORATION, Tokyo (JP)

(72) Inventors: Yukinobu Ohura, Tokyo (JP); Senichi Ryo, Tokyo (JP); Yohei Yamashita, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 486 days.

(21) Appl. No.: 15/352,053

(22) Filed: Nov. 15, 2016

(65) Prior Publication Data

US 2018/0134905 A1    May 17, 2018

(51) Int. Cl.
| | |
|---|---|
| C09D 7/61 | (2018.01) |
| C09D 201/00 | (2006.01) |
| C09D 7/40 | (2018.01) |
| B23K 26/18 | (2006.01) |
| C09D 129/04 | (2006.01) |
| C08K 3/22 | (2006.01) |

(52) U.S. Cl.
CPC ............. *C09D 7/61* (2018.01); *B23K 26/18* (2013.01); *C09D 7/70* (2018.01); *C09D 129/04* (2013.01); *C09D 201/00* (2013.01); *C08K 3/22* (2013.01); *C08K 2003/2241* (2013.01)

(58) Field of Classification Search
CPC .................................................... B23K 26/36
See application file for complete search history.

(56) References Cited

U.S. PATENT DOCUMENTS

| | | | |
|---|---|---|---|
| 9,090,783 B2* | 7/2015 | Takanashi | ............... C09D 5/32 |
| 2014/0175070 A1* | 6/2014 | Ohura | .................. B23K 26/18 |
| | | | 219/121.69 |
| 2017/0067137 A1* | 3/2017 | Kawasaki | ................ B22F 5/10 |

FOREIGN PATENT DOCUMENTS

JP    2013-081951    5/2013

OTHER PUBLICATIONS

Mortensen, A. ((2007). Concise Encyclopedia of Composite Materials (2nd Edition)—Biomimetic Materials: Properties and Processing.) (Year: 2007).*

* cited by examiner

Primary Examiner — Peter L Vajda
Assistant Examiner — Asha A Thomas
(74) Attorney, Agent, or Firm — Greer Burns & Crain, Ltd.

(57) ABSTRACT

Disclosed herein is a protective film forming resin agent to be used for laser processing including a water-soluble resin, and particulates of a metal oxide which are dispersed in an aqueous solution of the resin and a section of which has an elongated shape having a major axis and a minor axis orthogonal to the major axis. The particulates of the metal oxide the section of which has the elongated shape having the major axis and the minor axis orthogonal to the major axis are dispersed in the aqueous solution of the resin. When the aqueous solution is applied to a workpiece to form a protective film on the workpiece and then the workpiece is subjected to laser processing, therefore, absorbance of a laser beam in the protective film is enhanced, so that processing efficiency is enhanced.

7 Claims, 8 Drawing Sheets

PROTECTIVE FILM FORMING RESIN AGENT AND LASER PROCESSING METHOD

BACKGROUND OF THE INVENTION

Field of the Invention

The present invention relates to a protective film forming resin agent to be used for laser processing, and to a laser processing method in which a substrate is subjected to laser processing after coated with the protective film forming resin agent.

Description of the Related Art

Conventionally, a laser beam has been used for cutting and dividing a plate-shaped workpiece such as a glass. Japanese Patent Laid-Open No. 2013-81951 describes a method in which when subjecting a glass substrate to ablation by applying a laser beam to the glass substrate, the glass substrate is coated with a resin in which fine particles of a metal oxide such as titanium dioxide ($TiO_2$) are dispersed, to form a protective film on the glass substrate, whereby laser beam absorption efficiency is enhanced and processability of the glass substrate is enhanced.

By such a technology, it is possible to reduce generation rates of chipping and laser burn, as compared to the case where a resin in which a metal oxide is not dispersed is used as a liquid for forming a protective film.

SUMMARY OF THE INVENTION

Even in the invention of Japanese Patent Laid-Open No. 2013-81951, however, it is still desired to make further enhancement in terms of processability, processing quality, and yield.

Accordingly, it is an object of the present invention to provide a laser processing method by which it is possible to make further enhancement of processability, processing quality, and yield.

In accordance with an aspect of the present invention, there is provided a protective film forming resin agent to be used for laser processing, including a water-soluble resin, and particulates of a metal oxide which are dispersed in the water-soluble resin and a section of which has an elongated shape having a major axis and a minor axis orthogonal to the major axis.

Preferably, in regard of the particulates of the metal oxide, the major axis has a length of not more than 500 nm, and the minor axis has a length of 1/10 to 1/5 times the length of the major axis. Preferably, the protective film forming resin agent contains 0.1 to 10% by volume of the particulates of the metal oxide.

In accordance with another aspect of the present invention there is provided a laser processing method for applying a laser beam to a substrate to perform ablation, the laser processing method including a protective film forming step and a laser processing step. The protective film forming step applies a protective film forming resin agent to at least a region on a substrate to be ablated, to form a protective film containing particulates of a metal oxide in the region. The laser processing step applies a laser beam to the region formed with the protective film, to ablate the substrate, after the protective film forming step is conducted.

In the protective film forming resin agent according to the present invention, particulates of a metal oxide a section of which has an elongated shape having a major axis and a minor axis orthogonal to the major axis are dispersed in a water-soluble resin. Therefore, the protective film forming resin agent is excellent in dispersion properties of the particulates in the resin. For this reason, when the protective film forming resin agent is applied to a workpiece to form a protective film and then the workpiece is subjected to laser processing, absorbance of a laser beam in the protective film is enhanced, and processing efficiency is enhanced. Accordingly, even a substrate showing a low absorbance at the wavelength of the laser beam can be laser processed efficiently. In addition, processing quality is also enhanced, and it is possible to enhance the yield of the product produced by the processing.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
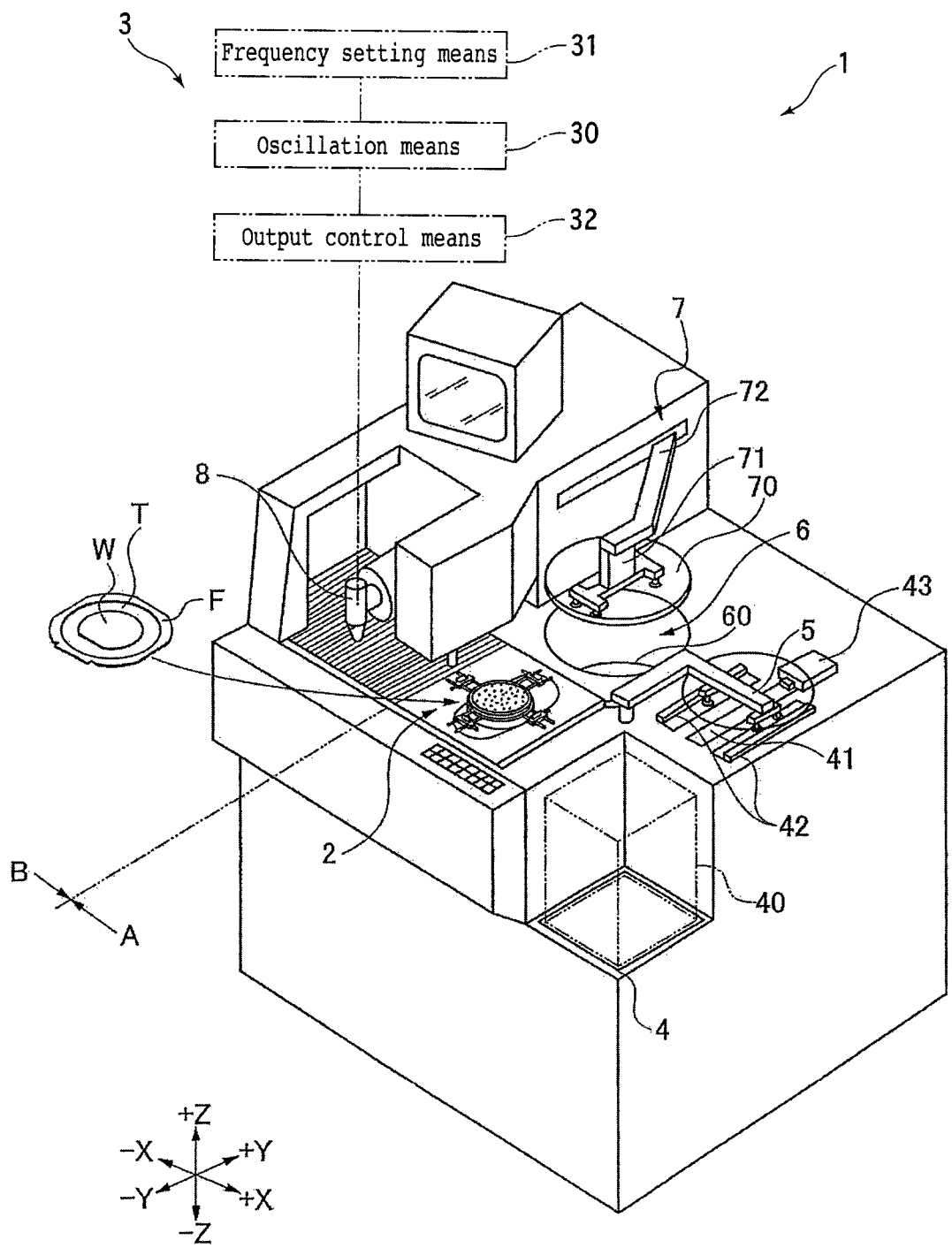
FIG. 1 is a perspective view of an example of a laser processing apparatus.

A laser processing apparatus 1 shown in FIG. 1 is an apparatus for processing by laser processing means 3 a plate-shaped workpiece W held on a chuck table 2. The plate-shaped workpiece W has a back side attached to a tape T, to which an annular frame F is attached, so that the plate-shaped workpiece W is supported by the frame F through the tape T.

The laser processing apparatus 1 is provided on a front side (−Y direction side) with a cassette placing region 4, and a cassette 40 in which a plurality of the plate-shaped workpieces W each supported by the frame F are accommodated is placed in the cassette placing region 4. The cassette placing region 4 can be moved upward and downward. On a rear side (+Y direction side) of the cassette placing region 4, there is provided a temporary placing region 41 in which the plate-shaped workpiece W supported by the frame F is placed temporarily. The temporary placing region 41 is provided with position matching means 42 for matching the plate-shaped workpiece W to a predetermined position. In addition, on the rear side (+Y direction side) of the temporary placing region 41, there is provided carrying-in/out means 43 by which the plate-shaped workpiece W supported by the frame F is carried out from the cassette 40 and carried into the cassette 40.

Figure 2:
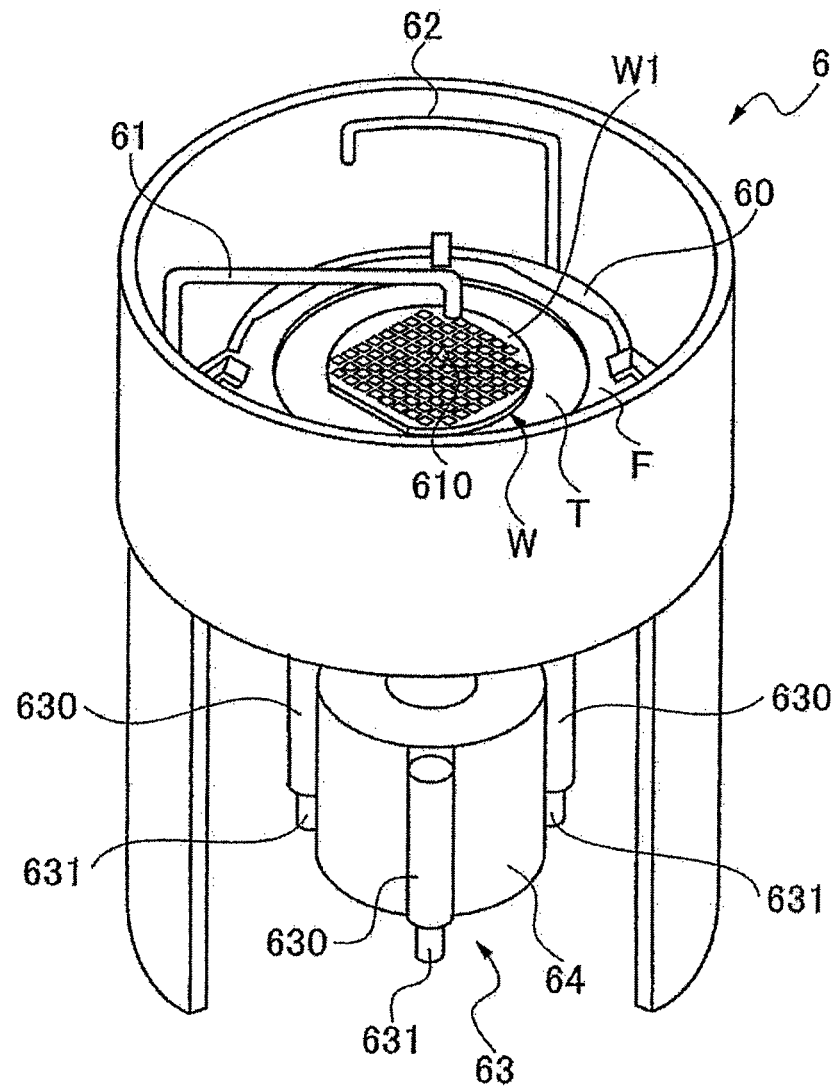
FIG. 2 is a perspective view of protective film forming means provided with the laser processing apparatus.

The chuck table 2 can be moved in an X-axis direction, between a mounting/dismounting region A where the plate-shaped workpiece W supported by the frame F mounted onto and dismounted from the chuck table 2, and a processing region B where laser processing is performed, and the chuck table 2 can also be moved in a Y-axis direction. On the +Y direction side of the mounting/dismounting region A, there is disposed protective film forming means 6 for forming a protective film on a surface of the plate-shaped workpiece W yet to be subjected to laser processing. As depicted in FIG. 2, the protective film forming means 6 includes a holding unit 60 by which the plate-shaped workpiece W supported by the frame F is held and rotated, a resin nozzle 61 through which a liquid resin is dropped onto the plate-shaped workpiece W held on the holding unit 60, and a cleaning liquid nozzle 62 through which a cleaning liquid is dropped onto the plate-shaped workpiece W. The holding unit 60 can be moved upward and downward by a lift unit 63, and can be rotated under driving of a motor 64.

The lift unit 63 includes a plurality of air cylinders 630 fixed to a side surface side of the motor 64, and rods 631, such that the motor 64 and the holding unit 60 are moved upward and downward by upward and downward motions of the air cylinders 630.

As shown in FIG. 1, in the vicinity of the temporary placing region 41, there is disposed first carrying means 5 by which the plate-shaped workpiece W supported by the frame F is carried between the temporary placing region 41 and the protective film forming means 6.

On the upper side of the protective film forming means 6, there is disposed second carrying means 7 by which the plate-shaped workpiece W supported by the frame F is carried from the protective film forming means 6 to the chuck table 2 located in the mounting/dismounting region A. The second carrying means 7 includes a suction holding unit 70 by which the plate-shaped workpiece W is held by suction, a lift unit 71 by which the suction holding unit 70 is moved upward and downward, and an arm unit 72 by which the suction holding unit 70 and the lift unit 71 are moved in the Y-axis direction.

The laser processing means 3 includes oscillation means 30 for oscillating a laser beam, frequency setting means 31 for setting a repetition frequency of the laser beam, output control means 32 for controlling the output of the laser beam, and focusing means 8 for focusing the laser beam.

Now, an outline of operations of the laser processing apparatus 1 shown in FIG. 1 at the time of laser processing of the plate-shaped workpiece W will be described below. First, a plurality of the plate-shaped workpieces W each supported by the frame F are accommodated in the cassette 40. Then, the plate-shaped workpiece W is clamped and carried out into the temporary placing region 41 together with the frame F by the carrying-in/out means 43.

<Protective Film Forming Step>

After the plate-shaped workpiece W is positionally matched to a predetermined position by the position matching means 42 in the temporary placing region 41, the plate-shaped workpiece W supported by the frame F is carried to the holding unit 60 of the protective film forming means 6 by the first carrying means 5, and is held with a front side W1 thereof exposed to the upper side, as depicted in FIG. 2. Then, a protective film forming resin agent 610 is dropped through the resin nozzle 61 shown in FIG. 2 onto the front side W1 of the plate-shaped workpiece W, and the holding unit 60 is rotated, whereby the protective film forming resin agent 610 is applied to the whole area of the front side W1. Note that the protective film forming resin agent 610 may be applied by a spin coating method as in the present embodiment, or may be applied by jetting through a slit-shaped nozzle.

Figure 3:
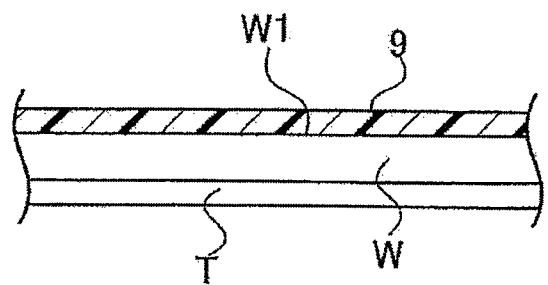
FIG. 3 is a partial enlarged view of a plate-shaped workpiece having a surface coated with a protective film.

After the protective film forming resin agent 610 is applied onto the front side W1 of the plate-shaped workpiece W, the protective film forming resin agent 610 is dried and solidified by, for example, rotating the holding unit 60, whereby a protective film 9 depicted in FIG. 3 is formed as a coating. Note that the protective film forming resin agent 610 may be dried by irradiation with light from a lamp (e.g., a xenon flash lamp). In that case, it is recommendable to perform irradiation with pulsed light, for avoiding a rise in temperature. Besides, baking by use of a hot plate may also be conducted.

After the front side W1 of the plate-shaped workpiece W is coated with the protective film 9 containing the particulates of a metal oxide, as shown in FIG. 3, the lift unit 71 of the second carrying means 7 is lowered, and the plate-shaped workpiece W is held onto the suction holding unit 70 by suction. Then, the lift unit 71 is moved upward, and the arm unit 72 is moved in the −Y direction, whereby the plate-shaped workpiece W is moved to a position on the upper side of the chuck table 2 located in the mounting/dismounting region A, then the lift unit 71 is lowered and the suction holding of the plate-shaped workpiece W by the suction holding unit 70 is released, whereby the plate-shaped workpiece W is placed on and suction held by the chuck table 2.

<Laser Processing Step>

Subsequently, the chuck table 2 is moved in a −X direction, a street (division line) to be processed is detected, and positional matching between the focusing means 8 and the street in the Y-axis direction is performed. Then, the chuck table 2 is further subjected to processing feed in the X-axis direction, and a laser beam is applied to that region of the front side W1 of the plate-shaped workpiece W in which the protective film is formed, through the protective film 9 by the focusing means 8, whereby ablation is conducted along the street. The processing feed rate may be, for example, 10 mm/second to 300 mm/second. In addition, the laser beam may be controlled, for example, to have a wavelength of 355 nm, an output of 0.5 W to 10 W, and a repetition frequency of 10 kHz to 200 kHz.

Now, the protective film 9 formed as a coating by the protective film forming means 6 will be described in detail below. The protective film forming resin agent 610 dropped as shown in FIG. 2 is configured to have a metal oxide dispersed in a water-soluble resin. Examples of the water-soluble resin to be used here include polyvinyl alcohol (PVA) and polyvinylpyrrolidone (PVP), other examples being polyethylene glycol, polyethylene oxide, polyethylene imine, carboxymethyl cellulose, hydroxyethyl cellulose, etc. Polyvinyl alcohol and polyvinylpyrrolidone may each have a viscosity of 20 cp to 400 cp. In addition, the metal oxide may be particulates of titanium dioxide ($TiO_2$), for example. Other examples of the metal oxide than titanium dioxide include $Fe_2O_3$, ZnO, $CeO_2$, CuO, $Cu_2O$, and MgO. These metal oxides are selected based on the absorbance of the laser beam at the wavelength of the laser beam used at the time of processing.

Figure 4:
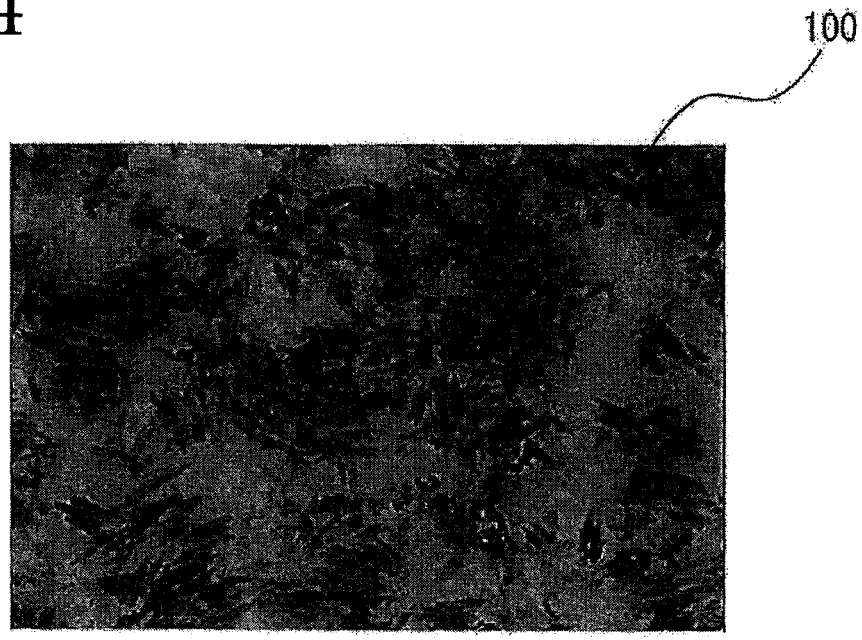
FIG. 4 is a magnified photo of a protective film formed by use of a protective film forming resin agent according to an embodiment of the present invention.

Photo 100 in FIG. 4 shows, in a magnified form, the protective film 9 formed by use of the protective film forming resin agent 610 according to the present invention. The particulates of the metal oxide are not circular, but are formed in an indefinite elongated shape having a major axis and a minor axis orthogonal to the major axis. The elongated shape includes ellipses, polygons, acicular shapes and the like, the orientation of which is irregular. The elongated shapes include highly anisotropic shapes. For example, the major axis has a length of not more than 500 nm, and the minor axis has a length of 1/10 to 1/5 times the length of the major axis. The length of the major axis is preferably 1 nm to 100 nm, more preferably 20 nm to 50 nm. If the length of the major axis exceeds 500 nm, the effect of scattering of the laser beam becomes predominant, which is undesirable for laser processing.

The concentration of the particulates of the metal oxide is preferably 0.1 to 10% by volume, more preferably 0.5 to 5% by volume, and further preferably 1 to 2.5% by volume, based on the total volume (the volume of the metal oxide plus the volume of the resin). Note that when the protective film 9 is used as an etching mask at the time of plasma dicing (dry etching), plasma resistance can be enhanced.

Example 1

Particulates of a metal oxide (titanium oxide ($TiO_2$)) shown in photo 100 in FIG. 4 were dispersed in water, to form a dispersion ($TiO_2$ concentration: 30% by weight). The dispersion was mixed into an aqueous solution of polyvinyl alcohol (GL-05, made by The Nippon Synthetic Chemical Industry Co., Ltd.), followed by stirring with a stirrer, to prepare a sample (water-soluble resin) of an Example in which the particulates of $TiO_2$ with an elongated shape were dispersed in the aqueous polyvinyl alcohol solution. The particulates of $TiO_2$ had a particle diameter (major axis length) of 20 nm to 50 nm. The $TiO_2$ particulates occupied 62% of the total volume including the water-soluble resin.

Figure 5:
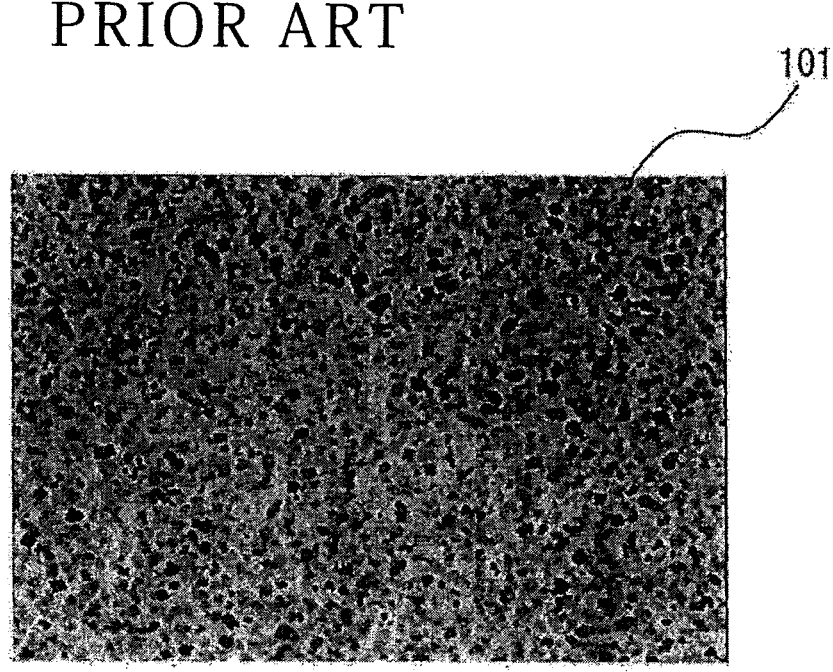
FIG. 5 is a magnified photo of a protective film formed by use of a protective film forming resin agent according to a prior art.

On the other hand, as a Comparative Example, particulates of titanium oxide having a substantially spherical shape instead of an elongated shape as shown in photo 101 in FIG. 5 were dispersed in water to form a dispersion ($TiO_2$ concentration: 30% by weight), and the dispersion was mixed into an aqueous solution of water-soluble polyvinyl alcohol (GL-05, made by The Nippon Synthetic Chemical Industry Co., Ltd.), followed by stirring with a stirrer, to prepare a sample (water-soluble resin) of the Comparative Example in which the particulates of $TiO_2$ were dispersed in the aqueous polyvinyl alcohol solution. The $TiO_2$ particulates occupied 80% of the total volume including the water-soluble resin.

Each of the water-soluble resin of the Example and the water-soluble resin of the Comparative Example was applied to a surface of a glass to form a protective film, and a laser beam was applied to the glass along a street on the glass, to perform ablation.

Photos shown in FIGS. 6A to 9B are photos of those parts of the glasses coated respectively with the protective films of the Example and the Comparative Example which were subjected to ablation by use of the laser processing apparatus 1 depicted in FIG. 1. Photos 201, 301, 401, and 501 in FIGS. 6A to 9A show the results of processing in the Examples, whereas photos 202, 302, 402, and 502 in FIGS. 6B to 9B show the results of processing in the Comparative Examples.

Each of photos 201, 301, 401, and 501 in FIGS. 6A to 9A is obtained by coating a part (left side) on the left side of a boundary 601, 603, 605, or 607 of a glass surface with only the liquid resin to form a protective film and coating a part (right side) on the right side of the boundary 601, 603, 605, or 607 of the glass surface with the protective film of the Example, subjecting the respective parts to ablation, and photographing the processed state of the parts. On the other hand, each of photos 202, 302, 402, and 502 in FIGS. 6B to 9B was obtained by coating a part (left side) on the left side of a boundary 602, 604, 606, or 608 of a glass surface with only the liquid resin to form a protective film and coating a part (right side) on the right side of the boundary 602, 604, 606, or 608 of the glass surface with a protective film forming resin agent containing the substantially spherical titanium oxide particulates dispersed therein to form a protective film, subjecting the respective parts to ablation, and photographing the processed state of the parts.

Figure 6A:
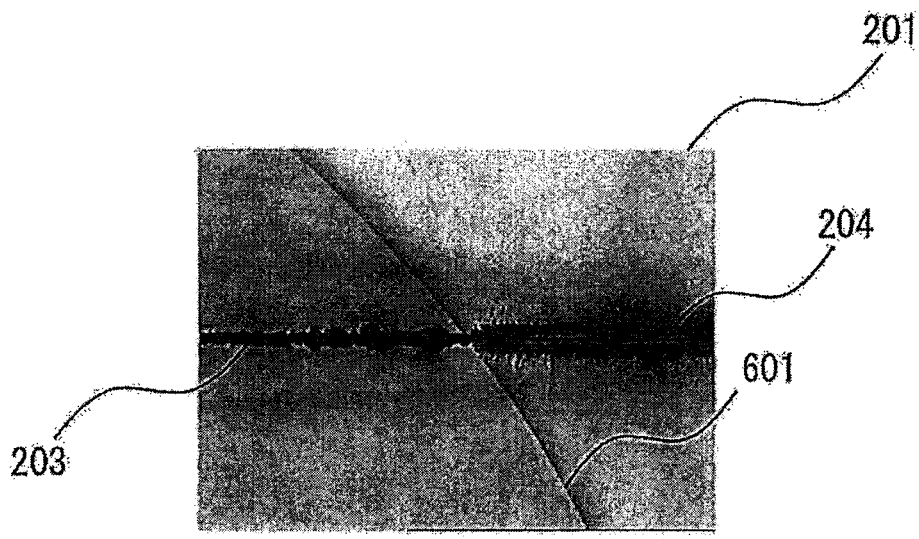
FIG. 6A is a magnified photo of that part of a substrate coated with a protective film in an embodiment which was ablated under the processing conditions of an output of 3 W, a repetition frequency of 40 kHz, and a feed rate of 150 mm/second.
Figure 6B:
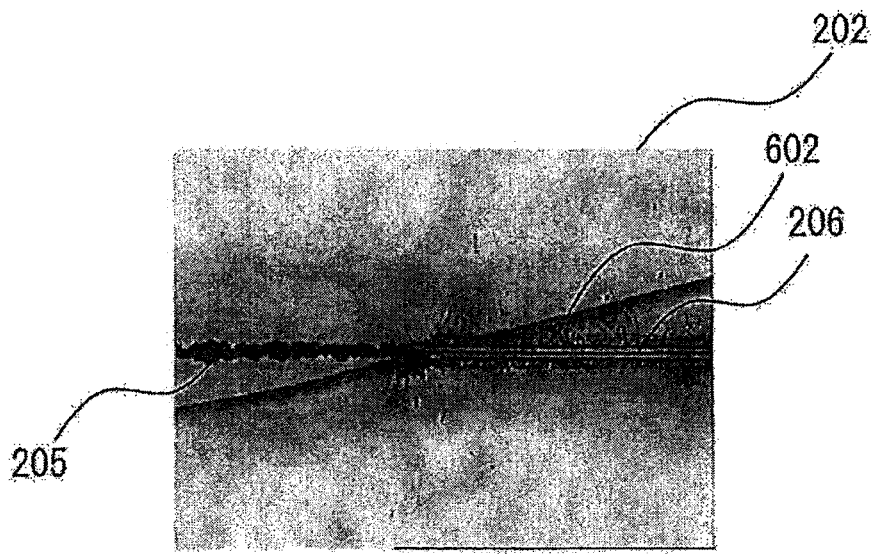
FIG. 6B is a magnified photo of that part of a substrate coated with a protective film in a comparative example which was ablated under the same processing conditions as in the case of FIG. 6A.

Processing conditions used in common to all the Examples and the Comparative Examples were as follows.
Wavelength: 355 nm
Output: 3 W FIGS. 6A and 6B show the results of processing under the processing conditions of a repetition frequency of 40 kHz and a feed rate of the chuck table 2 depicted in FIG. 1 of 150 mm/second. In photo 201 in FIG. 6A, the part coated with the protective film not containing titanium oxide and photographed on the left side of the boundary 601 has a processed groove 203 which is not rectilinear, and many chippings are seen generated on both sides of the processed groove 203. On the other hand, the part coated with the protective film of the Example and photographed on the right side of the boundary 601 in photo 201 in FIG. 6A has no chippings on either side of a processed groove 204, and the processed groove 204 is formed to be rectilinear, verifying a high processing quality. In addition, the resin agent constituting the protective film was much scattered on both sides of the processed groove 204, verifying that the processing was performed efficiently.

In photo 202 in FIG. 6B, the part coated with the protective film not containing titanium oxide and photographed on the left side of the boundary 602 has a processed groove 205 which is not rectilinear, and many chippings are seen generated on both sides of the processed groove 205. On the other hand, the part coated with the protective film containing the substantially spherical titanium particulates dispersed therein and photographed on the right side of the boundary 602 in photo 202 in FIG. 6B is formed to be rectilinear. As compared with the processed groove 204 in photo 201 in FIG. 6A, however, the processed groove 206 in photo 202 in FIG. 6B is small in groove width, and small in the amount of the protective film forming resin agent scattered, thus verifying that the processed groove 204 in photo 201 in FIG. 6A was processed efficiently. Therefore, it was confirmed that in regard of titanium oxide contained in the protective film, the particulates with the indefinite elongated shape give an enhanced processing quality and an enhanced processing efficiency as compared to the particulates with the substantially spherical shape.

Figure 7A:
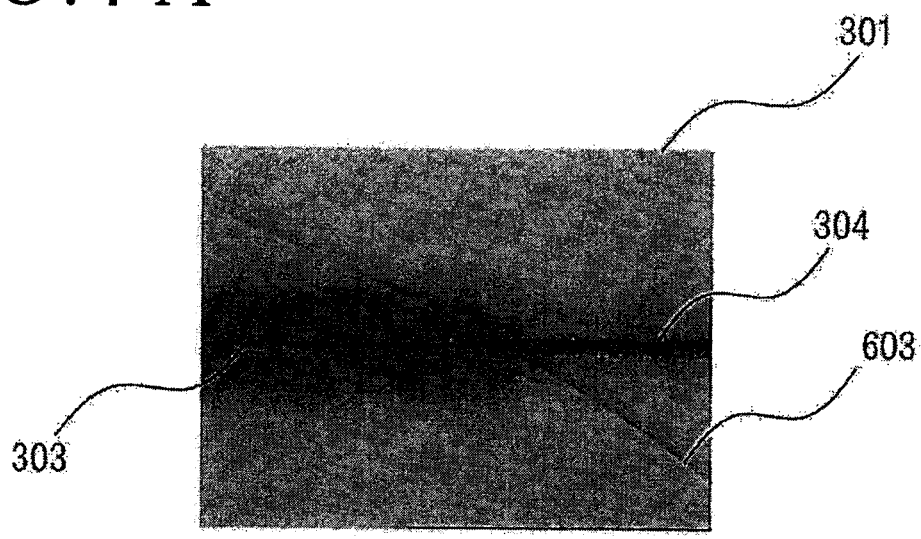
FIG. 7A is a magnified photo of that part of a substrate coated with a protective film in an embodiment which was ablated under the processing conditions of an output of 3 W, a repetition frequency of 40 kHz, and a feed rate of 250 mm/second.
Figure 7B:
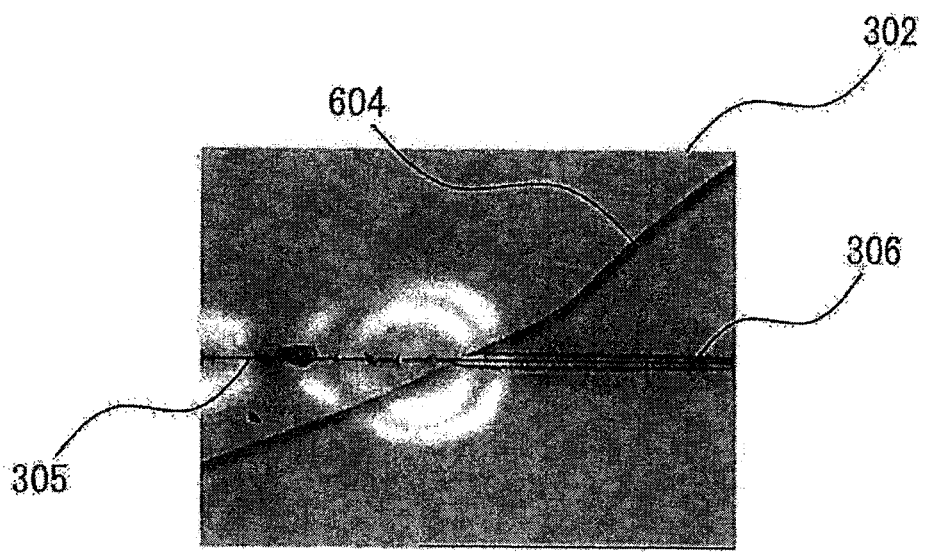
FIG. 7B is a magnified photo of that part of a substrate coated with a protective film in a comparative example which was ablated under the same processing conditions as in the case of FIG. 7A.

FIGS. 7A and 7B show the results of processing under the processing conditions of a repetition frequency of 40 kHz and a feed rate of the chuck table 2 depicted in FIG. 1 of 250 mm/second. In photo 301 in FIG. 7A, the part coated with the protective film not containing titanium oxide and photographed on the left side of the boundary 603 has a processed groove 303 not formed rectilinearly, and chippings are seen generated on both sides of the processed groove 303. On the other hand, the part coated with the protective film of the Example and photographed on the right side of the boundary 603 in photo 301 in FIG. 7A has no chippings on either side of a processed groove 304, and the processed groove 304 is formed to be rectilinear, verifying a high processing quality. In addition, the resin agent constituting the protective film is much scattered on both sides of the processed groove 304, verifying that the processing was performed efficiently.

In photo 302 in FIG. 7B, the part coated with the protective film not containing titanium oxide and photographed on the left side of the boundary 604 has a processed groove 305 not formed rectilinearly, and many chippings are seen generated on both sides of the processed groove 305. On the other hand, in photo 302 in FIG. 7B, the part coated with the protective film containing the substantially spherical titanium oxide particulates dispersed therein and photographed on the right side of the boundary 604 has a processed groove 306 formed to be rectilinear. As compared to the processed groove 304 in photo 301 in FIG. 7A, however, the processed groove 306 in photo 302 in FIG. 7B is small in groove width and small in the amount of the protective film forming resin agent scattered, verifying that the processed groove 304 in photo 301 in FIG. 7A was processed efficiently. Therefore, it was confirmed that in regard of titanium oxide contained in the protective film, the particulates with the elongated shape can give an enhanced processing quality as compared to the particulates with the substantially spherical shape.

Figure 8A:
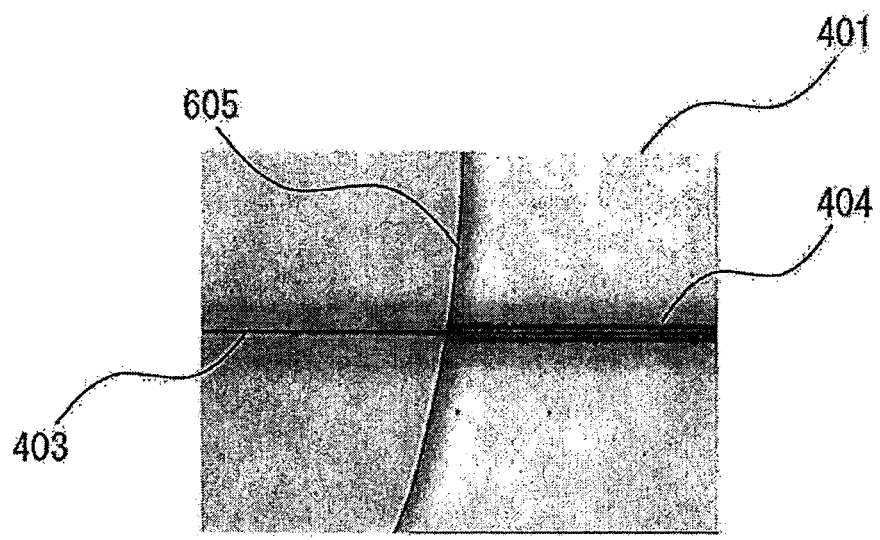
FIG. 8A is a magnified photo of that part of a substrate coated with a protective film in an embodiment which was ablated under the processing conditions of an output of 3 W, a repetition frequency of 120 kHz, and a feed rate of 150 mm/second.
Figure 8B:
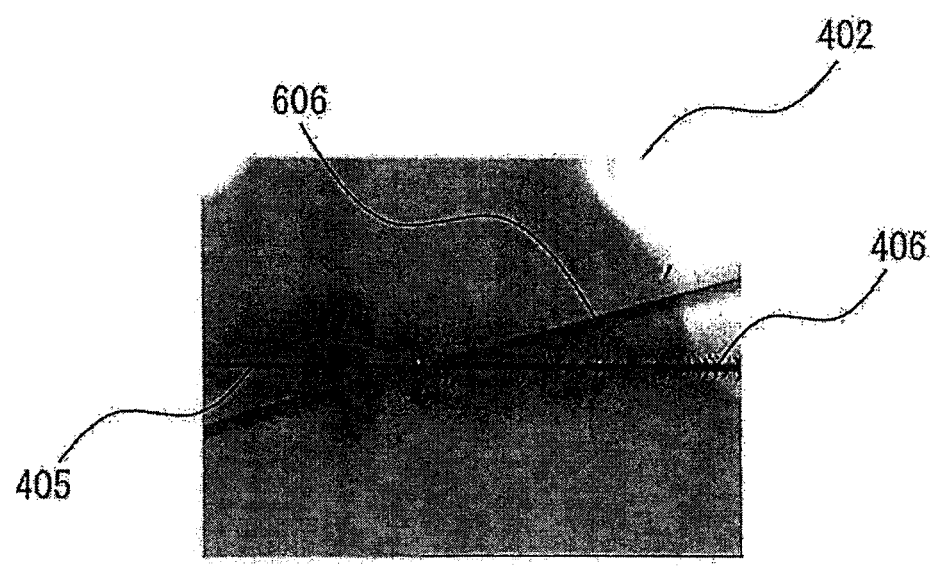
FIG. 8B is a magnified photo of that part of a substrate coated with a protective film in a comparative example which was ablated under the same processing conditions as in the case of FIG. 8A.

FIGS. 8A and 8B show the results of processing under the processing conditions of a repetition frequency of 120 kHz and a feed rate of the chuck table 2 depicted in FIG. 1 of 150 mm/second. In photo 401 in FIG. 8A, the part coated with the protective film not containing titanium oxide and photographed on the left side of the boundary 605 has a processed groove 403 having a small groove width. On the other hand, the part coated with the protective film of the Example and photographed on the right side of the boundary 605 in photo 401 in FIG. 8A has a processed groove 404 having a large groove width, and shows the protective film forming resin agent much scattered on both sides of the processed groove 404, verifying that the processing was performed efficiently.

In photo 402 in FIG. 8B, the part coated with the protective film not containing titanium oxide and photographed on the left side of the boundary 606 has a processed groove 405 having a small groove width. On the other hand, the part coated with the protective film containing the substantially spherical titanium oxide particulates dispersed therein and photographed on the right side of the boundary 606 in photo 402 in FIG. 8B has a processed groove 406 greater in groove width than the processed groove 405. As compared to the processed groove 404 in FIG. 8A, however, the processed groove 406 in FIG. 8B is small in groove width, verifying that the processed groove 404 in FIG. 8A was processed efficiently. Therefore, it was confirmed that in regard of titanium oxide contained in the protective film, the particulates with the elongated shape give an enhanced processing quality as compared with the particulates with the substantially spherical shape.

Figure 9A:
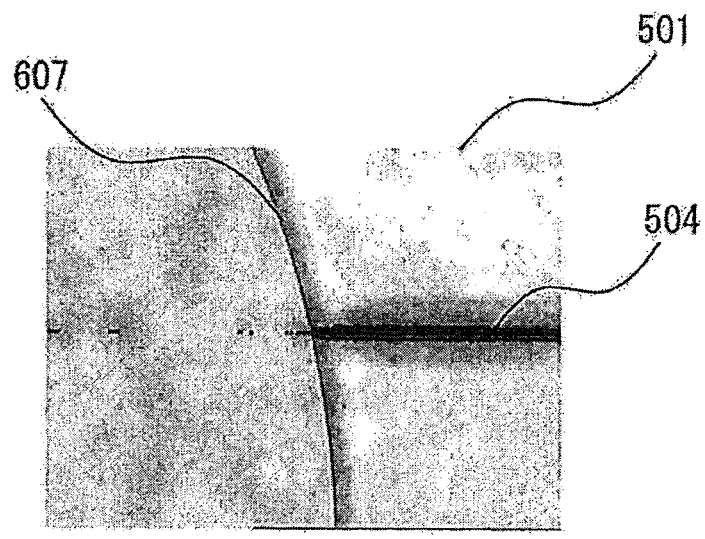
FIG. 9A is a magnified photo of that part of a substrate coated with a protective film in an embodiment which was ablated under the processing conditions of an output of 3 W, a repetition frequency of 120 kHz, a feed rate of 150 mm/second, and a defocus toward a substrate back side of 30 µm.
Figure 9B:
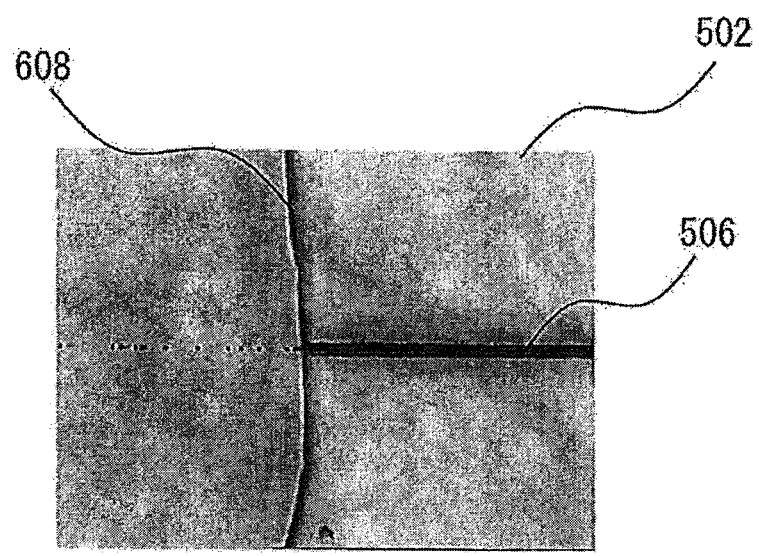
FIG. 9B is a magnified photo of that part of a substrate coated with a protective film in a comparative example which was ablated under the same processing conditions as in the case of FIG. 9A.

FIGS. 9A and 9B show the results of processing under the processing conditions of a repetition frequency of 120 kHz, a feed rate of the chuck table 2 depicted in FIG. 1 of 150 mm/second, and a defocus of the focal depth of the laser beam set to 30 μm toward the back side from the front surface. In photo 501 in FIG. 9A, the part coated with the protective film not containing titanium oxide and photographed on the left side of the boundary 607 has no continuous processed groove formed, showing that ablation could not be achieved. On the other hand, the part coated with the protective film of the Example and photographed on the right side of the boundary 607 in photo 501 in FIG. 9A has a processed groove 504 formed in a continuous rectilinear shape, verifying that ablation was performed. In addition, the processed groove 504 is large in groove width, which shows that the processing was conducted efficiently.

In photo 502 in FIG. 9B, the part coated with the protective film not containing titanium oxide and photographed on the left side of the boundary 608 has no continuous processed groove formed, showing that ablation could not be achieved. On the other hand, the part coated with the protective film containing the substantially spherical titanium oxide particulates dispersed therein and photographed on the right side of the boundary 608 in photo 502 in FIG. 9B has a processed groove 506 confirmed to be formed in a continuous rectilinear shape. As compared to the processed groove 504 in FIG. 9A, however, the processed groove 506 in FIG. 9B is small in groove width, verifying that the processed groove 504 in FIG. 9A was processed efficiently. Therefore, it was confirmed that even in the case where the focal point of the laser beam is deviated in the depth direction from the front surface, in regard of titanium oxide in the protective film, the particulates with the elongated shape such as an elliptical shape give an enhanced processing quality as compared to the particulates with the substantially spherical shape.

Table 1 given below shows average values of laser burn generation rate, chipping generation rate, and yield, in the case where a workpiece having a film of polyimide formed on silicon (hereinafter referred to as "this workpiece") was subjected to laser processing. The processing conditions were as follows.

Wavelength: 355 nm
Output: 2 W
Repetition frequency: 200 kHz
Spot diameter: 10 μm
Feed rate: 200 mm/second In Table 1, "No metal oxide" indicates the case where a liquid resin not containing particulates of a metal oxide was applied to this workpiece to form a protective film, "Comparative Example" indicates the case where a protective film forming resin agent containing substantially spherical particulates of titanium oxide dispersed therein was applied to this workpiece to form a protective film, and "Present Invention" indicates the case where a protective film forming resin agent containing titanium oxide particulates with an elongated shape dispersed therein was applied to this workpiece to form a protective film. Note that laser burn is a phenomenon in which a laser beam is reflected by scattered debris of protective film and is applied to a position where laser light application should not occur.

TABLE 1

|  | Laser burn generation rate (%) | Chipping generation rate (%) | Yield (%) |
| --- | --- | --- | --- |
| No metal oxide | 0.41 | 0.25 | 95.77 |
| Comparative Example | 0.28 | 0.19 | 94.86 |
| Present Invention | 0.04 | 0.00 | 97.05 |

A chipping generation rate of 0.00% in the Present Invention indicates that the chipping generation rate is below the detection limit.

As is clear from Table 1 above, it was confirmed that the use of the protective film forming resin agent of the Present Invention gave well results in all of laser burn generation rate, chipping generation rate, and yield, as compared with the case of no metal oxide and the case of Comparative Example.

Figure 10:
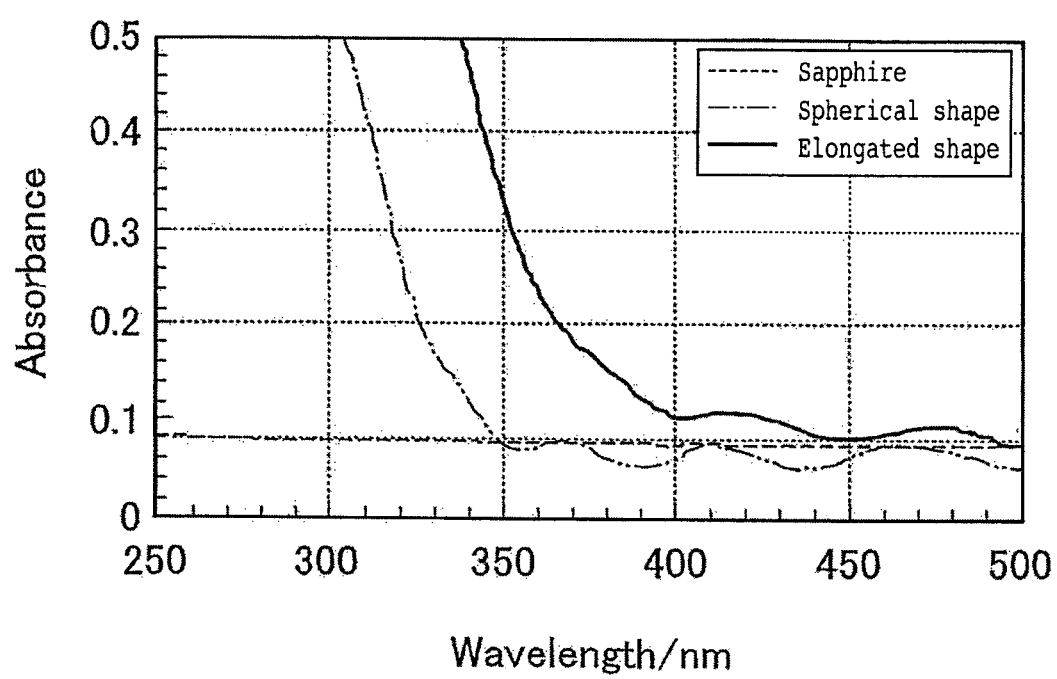
FIG. 10 is a graph showing a relationship between wavelength and absorbance of a laser beam.

A graph shown in FIG. 10 shows the results of determination of relationship between wavelength and absorbance of a laser beam, by measurement of absorption spectrum by use of a spectrophotometer V-670 made by JASCO Corporation, for each of a sapphire substrate (reference), a resin agent containing substantially spherical particulates of titanium oxide dispersed therein, and a resin agent containing titanium oxide particulates with an elongated shape dispersed therein.

As is seen from the graph in FIG. 10, the sapphire substrate (reference) showed a low absorbance regardless of the value of wavelength. On the other hand, the resin agents containing the titanium oxide particulates dispersed therein showed an absorbance lowered more as the wavelength was longer. In this case, the rate of lowering in absorbance with an increase in wavelength was lower, and hence a higher absorbance can be maintained, in the case where the particulates of titanium oxide constituting the resin agent had an elongated shape than in the case where the particulates had a substantially spherical shape. Therefore, it is considered that when a resin agent containing titanium oxide particulates with an elongated shape is adopted for forming a protective film, laser processing at an elongated wavelength can be performed efficiently, as compared with the case where the titanium oxide particulates have a substantially spherical shape.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing method for applying a laser beam to a substrate to perform ablation, the laser processing method comprising:
    a protective film forming step of applying a protective film forming resin agent to at least a region on a substrate to be ablated, to form a protective film in the region; and
    a laser processing step of applying a laser beam to the region formed with the protective film, to ablate the substrate, after the protective film forming step is conducted,
    wherein the protective film forming resin agent contains a water-soluble resin, and particulates of a metal oxide which are dispersed in the water-soluble resin, and
    wherein said particulates of said metal oxide have an elongated shape including a major axis, and a minor axis orthogonal to the major axis, said major axis having a length that is less than or equal to 500 nm, and said minor axis having a length that is one-tenth to one-fifth times the length of the major axis.

2. The method according to claim 1, wherein a concentration of said metal oxide is 0.1% to 10% by volume.

3. The method according to claim 1, wherein a concentration of said metal oxide is 0.5% to 5.0% by volume.

4. The method according to claim 1, wherein a concentration of said metal oxide is 1.0% to 2.5% by volume.

5. The method according to claim 1, wherein said length of said major axis is 1 nm to 100 nm.

6. The method according to claim 1, wherein said length of said major axis is 20 nm to 50 nm.

7. The method according to claim 1, wherein the protective film forming step includes applying a protective film forming resin agent to a front side of the substrate, and a tape to a back side of the substrate.

* * * * *